Figure 10:
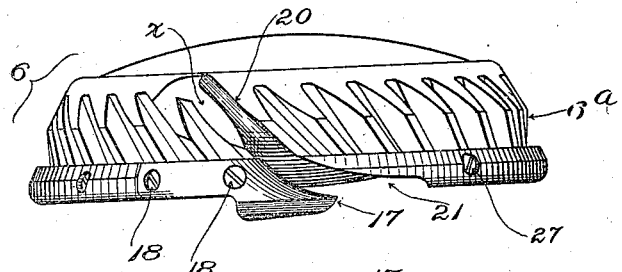

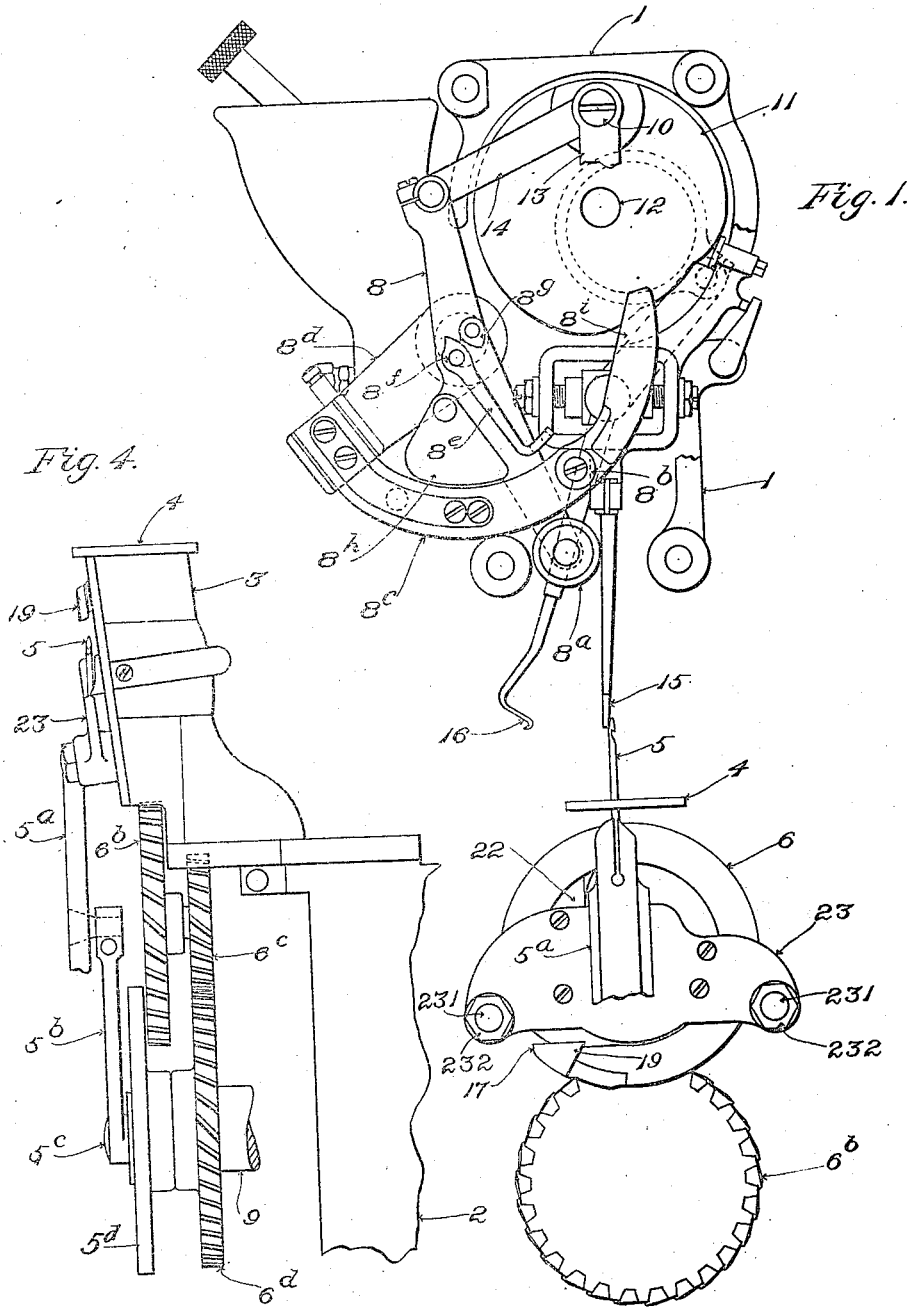

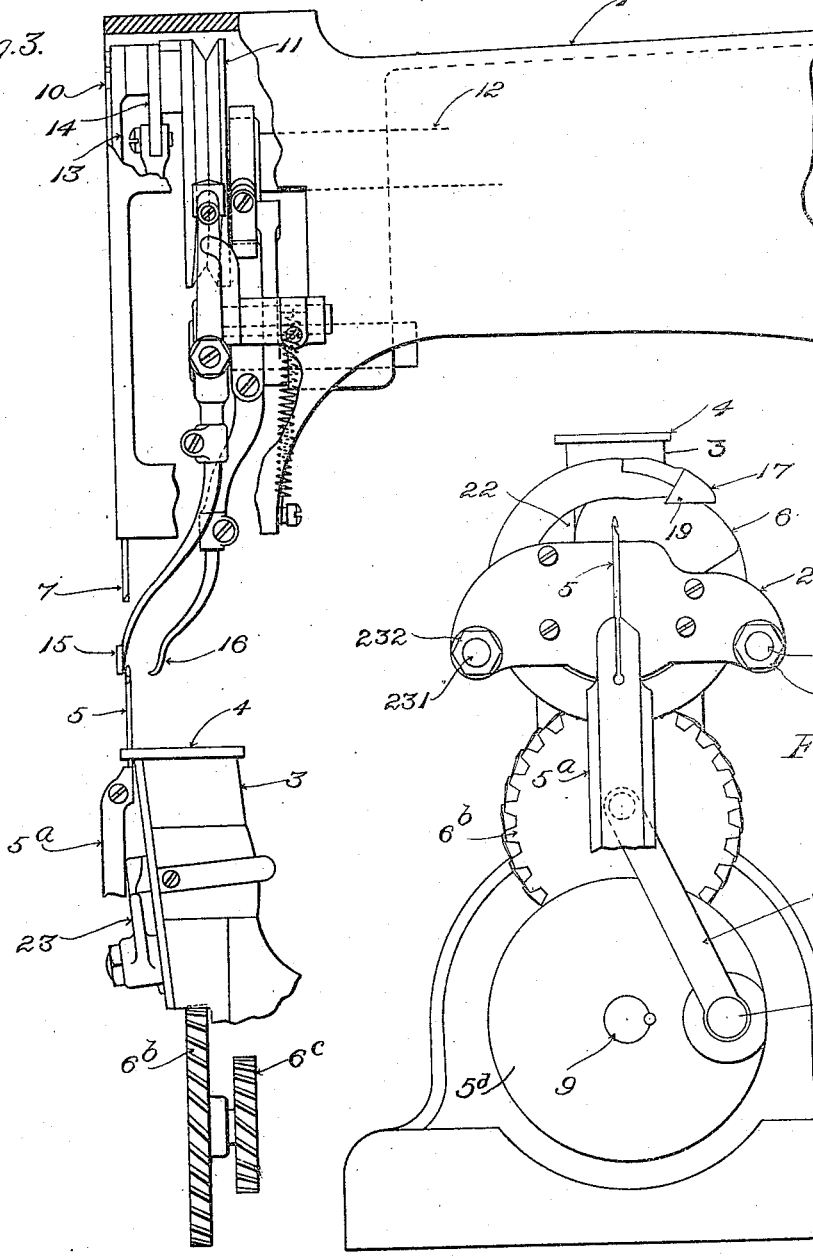

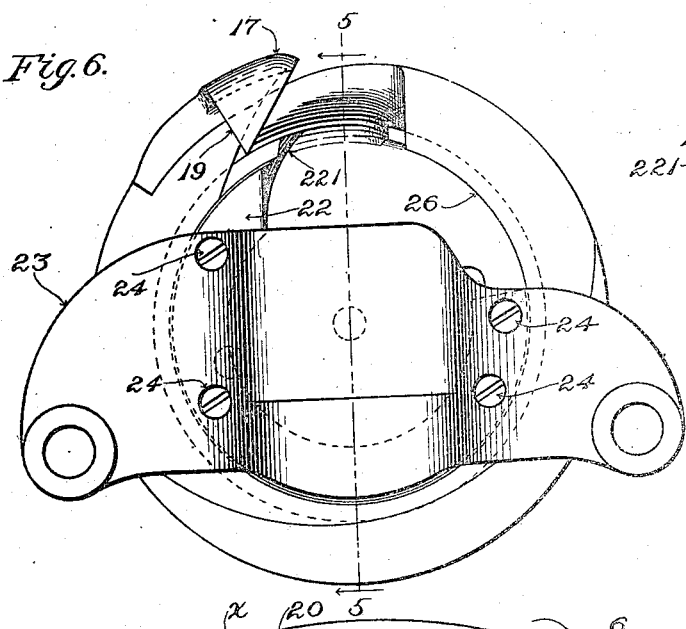
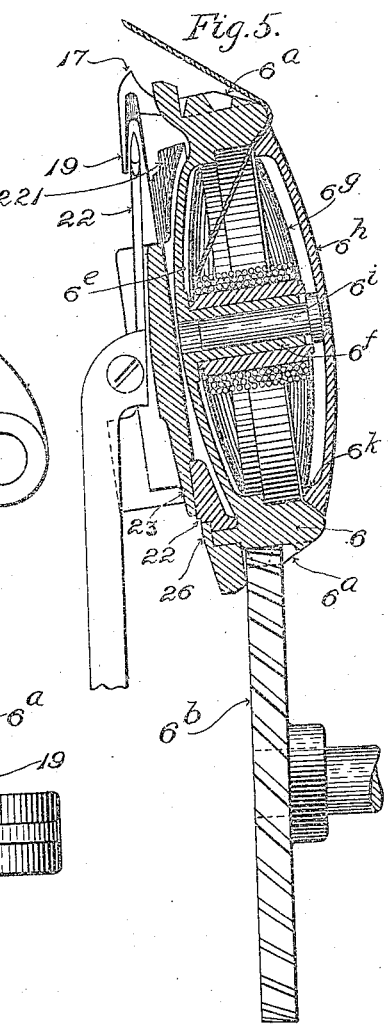
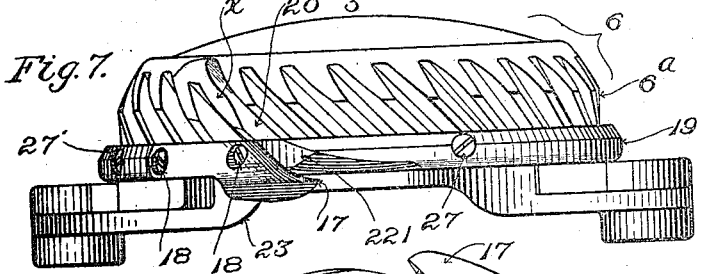
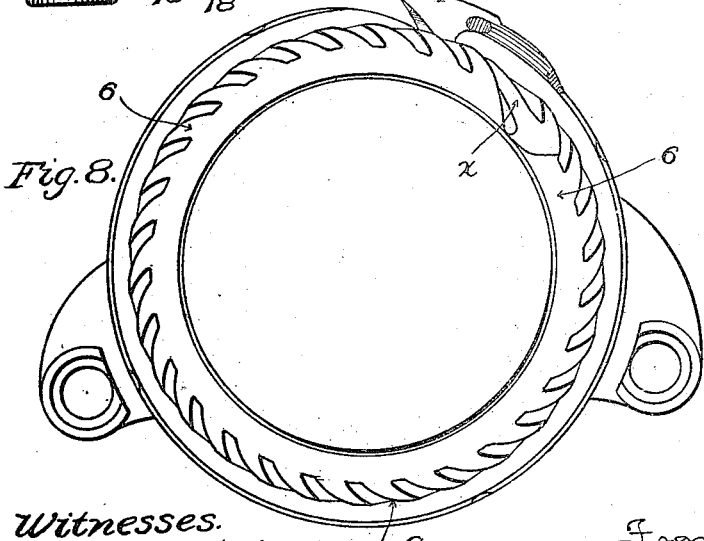

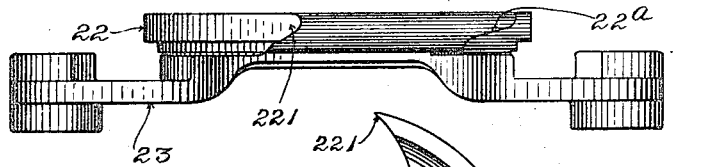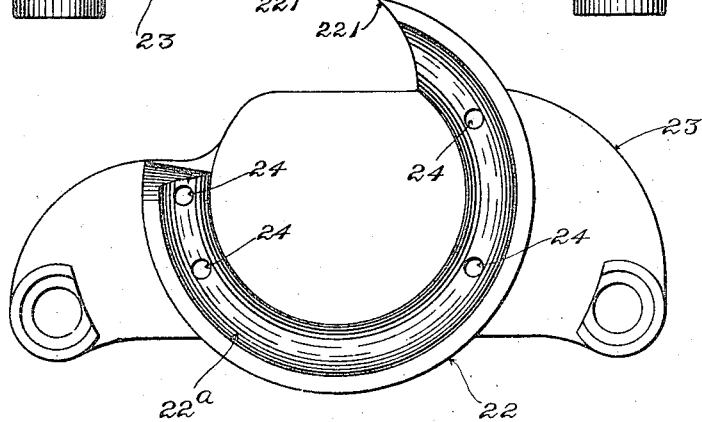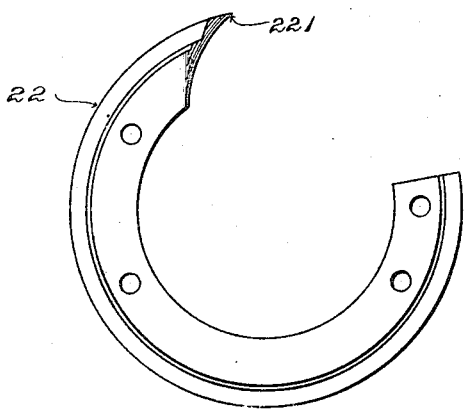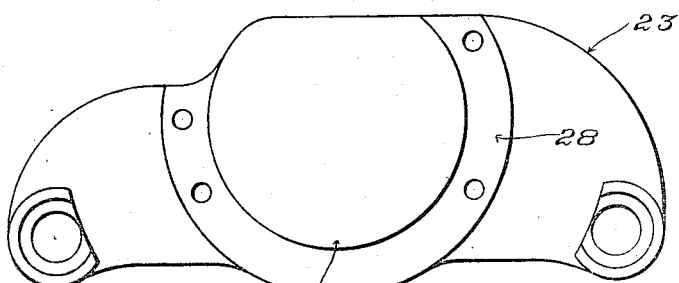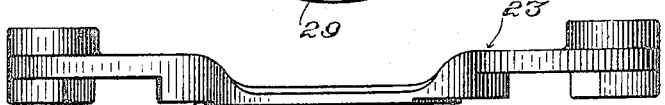

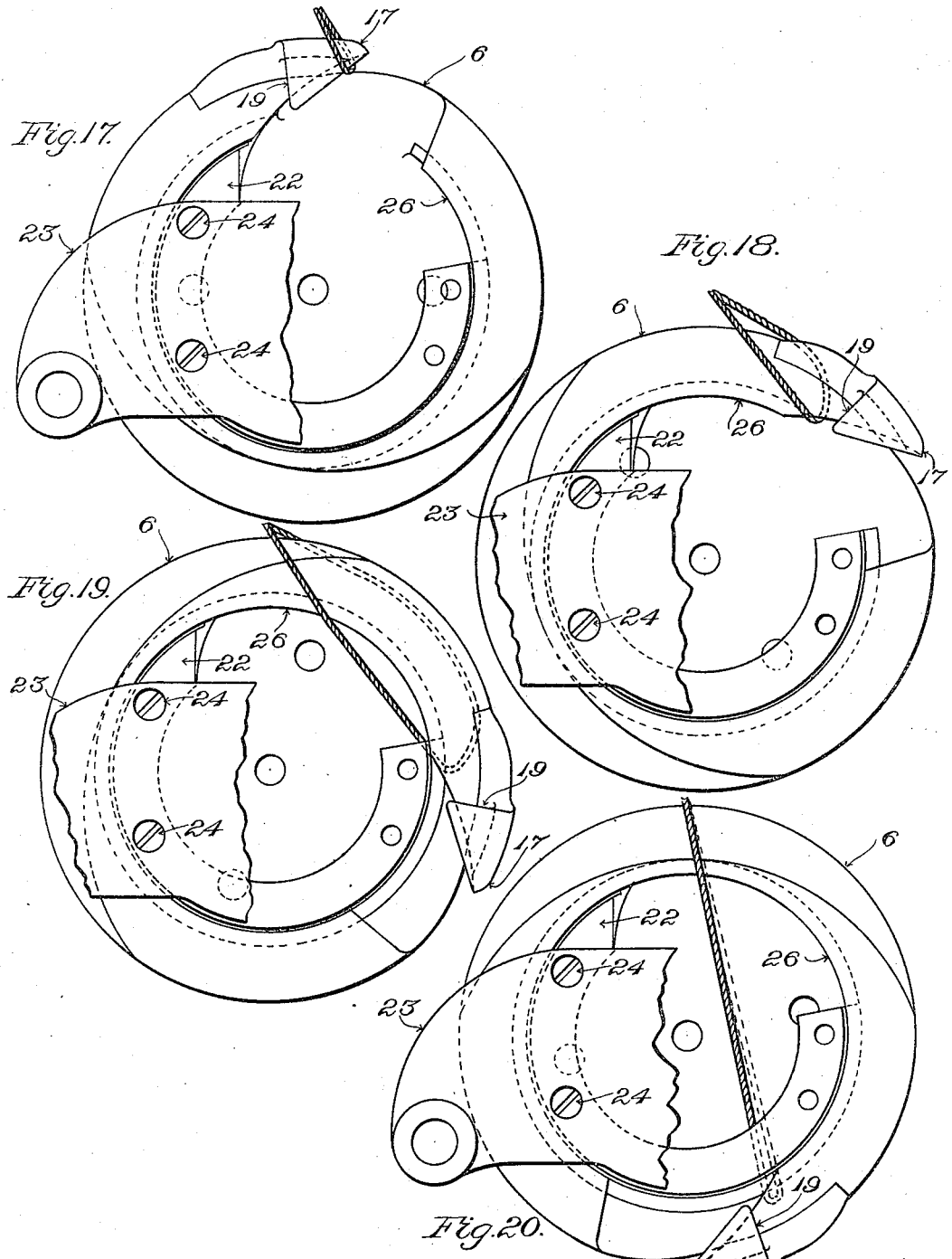

UNITED STATES PATENT OFFICE.

FRANK W. MERRICK, OF BOSTON, MASSACHUSETTS, ASSIGNOR TO UNION LOCK STITCH COMPANY, OF BOSTON, MASSACHUSETTS, A CORPORATION OF MAINE.

SEWING-MACHINE.

945,851.   Specification of Letters Patent.   Patented Jan. 11, 1910.

Application filed February 17, 1908.  Serial No. 416,197.

*To all whom it may concern:*

Be it known that I, FRANK W. MERRICK, a citizen of the United States, residing at Boston, in the county of Suffolk and State of Massachusetts, have invented a certain new and useful Improvement in Sewing-Machines, of which the following is a specification, reference being had therein to the accompanying drawings.

The invention relates to lock-stitch sewing machines of the class employing rotary loop-takers or shuttles, and comprises various improvements in part applicable more particularly to hook-needle machines of such class, although in part designed for application to other machines as well.

One main object of the invention is to produce a hook-needle lock-stitch sewing machine of simple and practical construction capable of a regular working speed far higher than attainable with machines heretofore in use. With this object in view, I combine in an organized machine a loop-taker or shuttle rotated at a uniform rate of speed, and an awl, a hook-needle, and a take-up device, all three actuated by means of uniformly-rotating cranks. By the employment of cranks for the actuation of the parts, and the uniform rotation, a machine embodying the above combination is characteristically distinguished from machines heretofore in use, in which cams and other mechanical devices for producing irregular or variable-speed motion are employed.

Controlling considerations in designing and constructing a hook-needle wax-thread machine are the fact that the awl and needle alternate in passing through the work. Also, the fact that a half of the needle-work, *i. e.*, taking the loop, etc., is performed at the side of the work opposite that from which the needle enters the work and at which the shuttle or loop-taker operates. Also, the further fact that the hook needle must withdraw from the work before the shuttle or loop-taker can pass through the loop drawn by the needle, and the fact that between the withdrawal of the needle from the work and the re-entry of the awl and needle into the same the action of the shuttle or loop-taker in "picking" the loop that has been drawn by the hook needle through the work, the passage of the shuttle or loop-taker through the loop or of the loop around the shuttle or loop-taker, and the subsequent action of the take-up in drawing-up the loop and tightening the stitch, all must be performed. If the said passage, and the drawing-up and tightening, are not completed in time, the thread will be pinched within the hole in which the stitch is being completed, by the between-substance being crowded over by the awl in penetrating the material to make a fresh awl-hole or by the needle in entering into the awl-hole, so as to prevent the stitch from being properly pulled up and locked.

The difficulties inherent in the foregoing requirements respecting time-relations have led inventors and designers heretofore to employ cams for the actuation of the awl, needle, and take-up, so as to hold up the action of each thereof at certain times during the cycle of movements of a machine to give time to get the shuttle or loop-taker through the loop, and to move the same with accelerated speed at other times so as to accomplish the required movements within the allotted time during the cycle of the machine; and have led them also to employ variable-speed motion-transmitting mechanism for driving the shuttle or loop-taker with an alternately accelerated and retarded speed.

Cams and the like are productive of noise, jar, and friction. They are subject to wear, with resulting play. They and variable-speed devices limit the practical working speed of a machine.

I have discovered that the drawbacks incident to the employment of cams and variable-speed devices can be eliminated and that a loop-taker or shuttle rotated at a uniform rate of speed, and a hook-needle, an awl, and a take-up, all three operated by means of uniformly-rotating cranks can be operatively combined in an easy-motioned rapid-running machine which operates successfully in practice with a regular speed threefold greater than that heretofore feasible.

It may here be pointed out that in respect of the proportionate allotment of time in the cycle of operations there is a material difference between a dry-thread machine employing an eye-pointed needle in combination with a rotating shuttle, and a wax-thread machine employing a hook-needle in the like combination. The conditions and requirements to be met are quite different in the two types of machines. In a dry-thread machine, the needle operates from the side of the work opposite that at which the shuttle is located, and the latter enters the loop of needle-thread while the needle is projecting through the work. Hence the said entrance may occur earlier in the cycle of operations. No awl is employed in a dry-thread machine, and consequently a portion of the time which in a hook-needle wax-thread machine is divided between the awl-movements and the needle-movements can be devoted, in the former machine, to a greater time-allotment for the passage of the loop around the shuttle or loop-taker, or of the latter through the loop, and for the setting of the stitch. In other words, in a dry-thread machine a larger proportion of an entire revolution of the driving shaft is available for the said passage and for the setting of the stitch, namely, from the moment the loop-taking point or hook of the shuttle enters the loop of needle-thread alongside the needle until just before the needle, after its withdrawal from the work, reënters the latter in beginning the formation of the succeeding stitch.

Other objects of the invention are to support the rotating shuttle or loop-taker in improved manner; facilitate the complete entrance of the loop-taking point or hook of the shuttle or loop-taker into the loop and the spreading of the latter for its passage about the shuttle or loop-taker; allow any required portion of a turn of the shuttle or loop-taker, up to one-half thereof, to be utilized for the spreading operation; enable the employment of moving spreaders, or of fixed devices, for the above purposes, and for that of preventing the loop from being carried by the rotation of the shuttle or loop-taker in between the latter and its bearing or support, to be dispensed with if desired; and eliminate likelihood of lint or a loose end of thread being similarly carried into the "raceway" so as to become jammed therein and choke or clog the machine.

Heretofore, in hook-needle wax-thread lock-stitch machines employing a rotary shuttle or loop-taker, the latter has been mounted within an external bearing. This bearing has been formed in practice with a transverse opening adjacent to the position of the needle, located in advance of such position, to afford opportunity for a loop of thread which has been taken from the needle by the loop-taking point or hook of the shuttle or loop-taker to be extended transversely across the thickness of the shuttle or loop-taker in being spread for passage around the latter. However, this opening has extended only a comparatively short distance circumferentially of the shuttle or loop-taker, because, in order to afford proper support to the latter, the bearing must fit the same close to the position of the needle. If the outside bearing should be cut away to a material extent in front of the position of the needle, the shuttle or loop-taker would press toward and into the opening so as to bind against the edges of the latter and cause the shuttle or loop-taker to run hard, as well as produce wear. One serious drawback in connection with the employment of an external bearing is the tendency of the exterior of the rotating shuttle or loop-taker to carry lint or an end of thread in between itself and the said bearing, into the raceway, as it is termed, so as to jam the same therein and choke or clog the machine. Furthermore, the loop-taking point or hook of a rotating shuttle or loop-taker tends to carry forward on its leading portion the loop just taken from the needle, instead of passing fully into the said loop so that the latter shall occupy the throat of the shuttle or loop-taker. This last tendency is increased by the stickiness of the threads that is due to waxing. The extent of the opening in an external bearing (measured circumferentially) is not sufficiently great to permit the advancing loop-taking point or hook to carry the unspread loop around far enough to assume an inclination or angle which will enable the natural draft or resistance of the loop by itself to hold the loop back while the point or hook pushes therethrough. Hence, the loop-taking point or hook tends to push the loop right into the raceway. It has been necessary, accordingly, to employ a supplemental device as a spreader to expand the loop sufficiently to enter the throat of the shuttle or loop-taker, and also necessary to employ the spreader or some other detent to prevent the loop from being carried into the raceway.

With the last-recited objects in view, and also the elimination of the defects and disadvantages just recited, the invention consists, further, in the combination with a rotary shuttle or loop-taker, of an internal bearing therefor.

Various other objects of the invention are indicated in the course of the following description, and other remaining features of invention are pointed out in the claims.

An embodiment of the various features of the invention, in the best form which I have thus far contrived, is illustrated in the drawings, in which latter—

Figure 9:
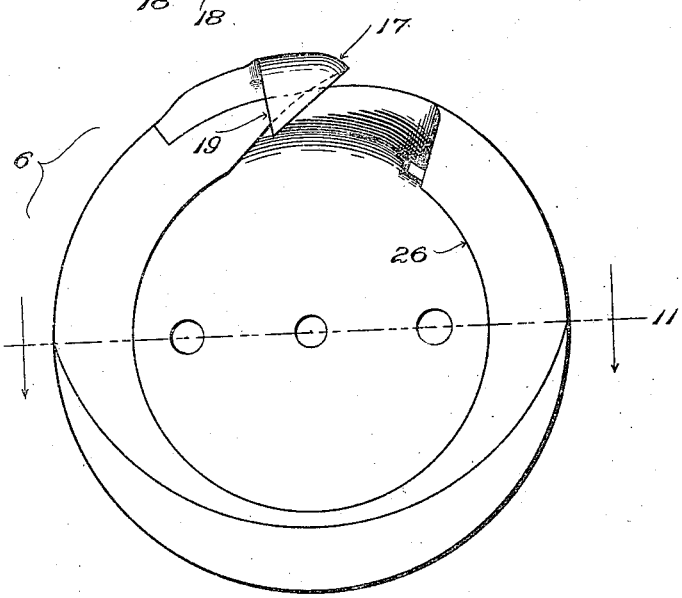
Figure 11:
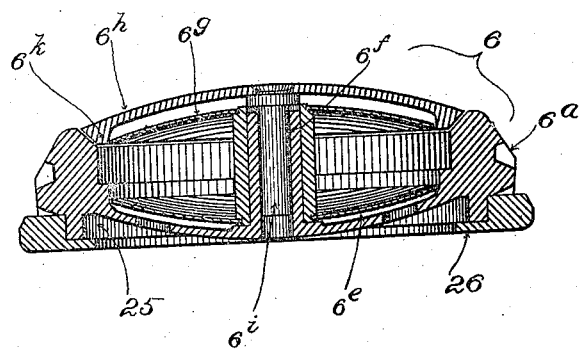

Figure 1 shows in end elevation certain portions of a lock-stitch, hook-needle, wax-thread sewing machine containing such embodiment. Fig. 2, Sheet 2, shows in end elevation the post and work-support, and parts below the latter, including some that are not shown in Fig. 1 for want of room. Fig. 3, Sheet 2, shows the parts of Fig. 1 in front elevation. Fig. 4, Sheet 1, shows the parts of Fig. 2 in front elevation. Fig. 5, Sheet 3, is a detail view on an enlarged scale, showing the shuttle and the support therefor in vertical transverse section in the plane of the dotted line 5, 5, of Fig. 6, and also showing the needle and a portion of the needle-bar. Fig. 6, Sheet 3, is a front elevation of the shuttle and shuttle-support. Fig. 7, Sheet 3, is a plan thereof. Fig. 8, sheet 3, is a rear elevation thereof. Fig. 9, Sheet 4, is a front elevation of the shuttle, shown separately. Fig. 10, Sheet 4, is a plan thereof. Fig. 11, Sheet 4, is a view in horizontal section in the plane of dotted line 11, 11, of Fig. 9. Fig. 12, Sheet 5, shows the shuttle-support in rear elevation. Fig. 13, Sheet 5, is a plan of the same as shown in Fig. 12. Fig. 14, Sheet 5, is a front elevation of the shuttle-bearing, detached from its support. Fig. 15, Sheet 5, is a rear elevation of the mounting for the shuttle-bearing. Fig. 16, Sheet 5, is a plan of the said mounting as shown in Fig. 15. Fig. 17, Sheet 6, is an elevation of the shuttle, the internal bearing therefor, and a portion of the bearing-support, showing the needle-loop as just taken by the loop-taking point or hook of the shuttle. Figs. 18, 19 and 20, Sheet 6, are views similar to Fig. 17, but showing different stages in the passage of the needle-loop around the shuttle.

Having reference to the drawings,—at 1, Figs. 1 and 2, is shown a portion of the overhanging arm and head of a sewing machine; at 2, Figs. 2 and 4, is shown a portion of the base of the machine-frame; at 3, Figs. 2, 3 and 4, is shown the post; and at 4, Figs. 1 to 4, is the work-support at the top of the post.

At 5 is a hook-needle, at 6 (Figs. 1 and 2) a rotating shuttle, at 7 (Fig. 3) an awl, and at 8 (Fig. 1) a take-up. The said needle works from below, and the rotating shuttle is located at the same side of the work. Both are actuated from the continuously driven, uniformly rotating, shaft 9, Figs. 2 and 4, which is mounted in the base of the machine. The needle is carried by the needle-bar $5^a$ (only a portion of which is shown), the said needle-bar being in practice suitably supported and guided in its movements, and shown as having connected pivotally therewith one end of a link $5^b$, the other end of which is connected to the crank-pin at $5^c$ carried by the disk $5^d$ fixed upon the said shaft, the said crank-pin consequently rotating at a uniform rate of speed. The shuttle is operatively combined with the said shaft, and driven therefrom at a uniform rate of speed, by means of the teeth $6^a$, Figs. 5 to 11, with which the shuttle is furnished, and the gear-train $6^b$, $6^c$, $6^d$, Figs. 2, 3 and 4, the gear $6^d$ being fixed upon shaft 9, and gears $6^b$, $6^c$, being connected to turn in unison, the gear $6^b$ being located immediately below the shuttle and meshing with the teeth of the shuttle at the lower side of the latter, and the gear $6^c$ meshing with the said gear $6^d$. The awl and take-up both are operated from the crank-pin at 10, carried by the disk 11 fixed upon the driving-shaft 12, the latter rotating at a uniform rate of speed and being mounted in the overhanging arm and head of the machine. The awl is operatively combined with the uniformly rotating crank-pin 10 by means of a link 13 (only a portion of which is shown in Figs. 1 and 3) having its upper end connected pivotally with the crank-pin and the other with the awl-bar (not shown) carrying the awl 7. The take-up is operatively combined with the said crank-pin by means of link 14, Figs. 1 and 3, having one end thereof connected pivotally with the crank-pin and the other end with the said take-up.

At 15, Figs. 1 and 3, is the thread-guide for laying the thread in the open eye of the hook-needle after the latter has been thrust through the work, and at 16 is the thread-finger for extending the thread above the work. These parts are operatively combined with the driving shaft 12 by means of instrumentalities which are shown in Figs. 1 and 3 but are unnecessary to be described inasmuch as the thread-guide and thread-finger and the said instrumentalities form no part of the invention itself.

In order to meet the requirements as to time resulting from rotating the shuttle or loop-taker at a continuous unvarying speed, and employing a needle working from the same side of the work as the shuttle or loop-taker and actuated by means of a uniformly rotating crank, the relative rate of rotation of the shuttle or loop-taker is doubled by suitably proportioning the gearing $6^d$, $6^c$, $6^b$, so that the shuttle or loop-taker makes two turns for each reciprocation of the needle. The movements of the needle and shuttle or loop-taker are so correlated that one complete turn of the latter takes place between the time when the needle, in descending, leaves the work, and that at which, in ascending, it reënters the work, and in operation the shuttle or loop-taker picks by its loop-taking point or hook the loop that has just been drawn through the work by the descending needle, and passes the said loop completely around itself and releases the loop in season to be drawn up and the stitch tightened, locked, and set, before the ascending needle again enters the work.

In the rotation of the shuttle or loop-taker the loop-taking point or hook thereof intersects the path of the needle by passing over the hooked end of the needle as the latter extends the loop of thread which has been drawn thereby through the material being stitched. In order that at the opposite point in the rotation of the shuttle or loop-taker the said point or hook may not strike the needle, needle-holder, or needle-bar, the support for the shuttle or loop-taker is constructed and arranged to cause the shuttle or loop-taker to rotate in a plane that is slightly inclined with relation to the path of the needle, as shown in Figs. 2, 4, and 5, so that at the said opposite point the loop-taking point or hook passes entirely to one side of the said parts, and thus clears the same. The inclination of the shuttle or loop-taker is not sufficient in extent to interfere with the intermeshing of its teeth 6ª with those of the gear 6ᵇ, as will appear from Fig. 5, Sheet 3.

The arrangement and proportions of the actuating crank at 10, link 14, and take-up 8, as shown in the drawings, produce a quick taking-up action following the completion of the passage of the loop around the shuttle or loop-taker, whereby the said loop is quickly drawn up and tightened and the stitch locked and set, so that this action is completed before the awl and needle reënter the work. A relatively prolonged dwell of the take-up in its retracted position then ensues.

The take-up lever 8 carries a draft-device, here constituted by a draft-roll 8ª, moving therewith for engagement with the upper thread. In order to enable a considerable length of thread to be taken up by a movement of small extent of the take-up lever, permitting a large shuttle and correspondingly large bobbin to be used for the interlocking thread without entailing undue length of stroke of the take-up lever to care for the amount of thread which is required for the passage over the shuttle, an opposing draft-device is employed. The latter herein is constituted by a stationary draft-roll 8ᵇ that is pivoted upon an arm 8ᶜ which in turn is fixed upon a stationary arm 8ᵈ. As the take-up lever 8 swings for the purpose of taking up the thread, the latter is carried by the draft-roll 8ª against the fixed draft-roll 8ᵇ so as to make bends or bights in the thread.
At 8ᵉ is a grip-lever pivoted at 8ᶠ upon the take-up lever, and having a clamping-face adjacent its pivot, and an eye or slot at the end of its long arm. At 8ᵍ is an opposing clamping-block mounted upon the take-up lever. The thread on its way from the source of supply passes between the opposing surfaces of the clamping-lever and clamping-block, and then through the slot or eye of the long arm of the clamping-lever, on its way to the thread-guide 15.

In the taking-up movement of the take-up lever, the draft-roll 8ª acts against the thread, carrying it against and bending it around the stationary draft-roll 8ᵇ. The thread held back by the latter acts to hold back the long arm of the gripping-lever 8ᵉ, causing the latter to turn on its pivot and clamp the thread against the clamping-block 8ᵍ. Thereby the thread is gripped between the taking-up draft-rolls and the source of supply. The long arm of the gripping-lever operates also, in the continued swinging movement of the take-up lever, as a moving draft-device at the inner side of the stationary draft-roll 8ᵇ, to take up a portion of thread.

At 8ʰ and 8ⁱ are slack-thread controllers, comprising thin plates which are applied, respectively, to the take-up lever and to the stationary arm. By the taking-up movement of take-up lever 8, i. e., in the direction from left to right in Fig. 1, one portion of the thread is caused to slip in between the said plate 8ʰ and the said lever 8, and another portion is caused to slip in between the plate 8ⁱ and the arm 8ᶜ, the thread being lightly clamped between the plates and the said lever and arm, respectively, and thereby yieldingly held as the take-up lever makes its return movement, and thus controlled.

The loop-taking point or hook of the shuttle is designated 17, the main portion thereof preferably being made as a separate piece, Figs. 6, 7, and 10, and secured in place upon the shuttle by means of screws 18, 18, Figs. 7 and 10, for convenience in construction and in making repairs. The said point or hook is located at the outer side of the shuttle, and in this instance is constructed with an offset, lateral, flange 19, shown best in Figs. 5, 6, and 9, and 17 to 20, extending inwardly toward the center of the shuttle, and somewhat separated from the adjacent end-face of the shuttle, the space between the said flange and the end-face being sufficient to accommodate the hooked end of the needle, as shown in Fig. 5, and allow the point or hook to pass over the upper end of the needle into the loop drawn by the latter, with the flange outside the needle, without collision with the needle. The acting faces of the loop-taking point or hook and the flange thereof are inclined with respect to the center of rotation, as shown in Figs. 1, 2, 6, 9, at an angle which, in the continued advancing movement of the said point or hook after it has entered within the loop held and being drawn by the needle, gains on the descending needle so as to extend such loop gradually in the direction in which the needle is moving, until it is pressed out of the open eye of the moving needle and thereby shed.

At 20, Figs. 7 and 10, is a throat extending transversely across the periphery of the shuttle from a somewhat enlarged opening 21, shown best in Fig. 10, just in front of the loop-taking point or hook. In order to enable the shuttle to be rotated continuously with smoothness and without rattle by means of a single driver 6ᵇ in gear-engagement therewith, the mouth, *i. e.* external opening of this throat, is located in an interval or space of normal width between two of the peripheral teeth 6ᵃ of the shuttle. The said teeth are spaced normally and uniformly at and adjacent the throat. In order to afford time for entrance of the loop of needle-thread into the throat as the shuttle rotates, as well as facilitate such entrance, the narrow mouth is made with an inclination rearward from the loop-taking point or hook, as shown best in Figs. 7 and 10. To accommodate this inclination of the said mouth, and avoid cutting through a tooth, the driving teeth 6ᵃ are inclined or helical, as shown, forming a spiral gear. The teeth of driver gear 6ᵇ are inclined or helical to match with those of the shuttle, constituting of it, also, a spiral gear.

To permit the inner side of the loop, in being spread transversely across the periphery of the shuttle, to slide readily upon the top of the tooth 6ᵃ next succeeding the throat, such top is beveled off for the greater portion of its length, as at *x*, Figs. 7, 8, and 10, so as to slope inward from near the loop-taking point or hook to the other end of the tooth. To prevent the inner ends of the teeth 6ᵃ from catching or fraying the said edge of the loop, the said ends are also inclined or beveled off, as shown in Figs. 5, 7, and 10.

At 22 is the bearing for the shuttle, it being provided on the fixed support 23 which extends across the outer face or end of the shuttle. A separately formed bearing piece is employed in this instance for convenience in constructing and assembling or disassembling the parts, it being removably attached to the said support by the screws 24, 24, etc. The bearing 22 is shown detached in Fig. 14 of Sheet 5, and the bearing-support 23 is shown detached in Figs. 15 and 16 of the same sheet. The bearing and bearing-support combined are shown separately in Figs. 12 and 13 of such sheet, and are represented in connection with the shuttle in Figs. 1, 2, 5, 6 and 7 and also in Figs 17 to 20.

The bearing 22 constitutes an internal support for the shuttle, which turns upon its exterior. The said bearing enters a nearly complete circular recess 25 in the outer side of the shuttle, as shown best in Figs. 5 and 11, and the shuttle-wall surrounding such recess makes contact with the peripheral surface of the bearing. Lateral displacement of the shuttle relative to the bearing is prevented by contact of the back wall of the said recess with the inner lateral face or edge of the bearing, and by contact of an inwardly projecting lip or flange 26 on the shuttle with the outer lateral face or edge of the bearing. See also Figs. 17 to 20. In this instance the said lip or flange is a portion of a separate ring which, for convenience in constructing and assembling and disassembling the parts, is fitted upon a peripheral portion of the shuttle-body and removably secured in place thereon by screws 27, 27, Figs. 7 and 10, the loop-taking point or hook being attached to the said ring by screws 18, 18, already mentioned. The bearing piece is reduced in diameter at the side thereof next the support or stand 23, by rabbeting the same as shown in Figs. 5 and 13, to receive the said lip or flange. It is formed as a partial annulus, and is applied to a corresponding seat 28, Fig. 5, upon the inner side of the support or stand. The latter is formed with a slightly projecting central boss 29, Figs. 15 and 16, around which the bearing piece fits, the said boss serving to fix the position of the bearing piece and relieve the attaching screws 24, 24, from strain. One end of the bearing is located adjacent the path in which the needle ascends and descends, slightly to the rear thereof, and the break in the continuity of the bearing extends thence toward the front and part way around. This is best shown in Figs 17 to 20, Sheet 6. As the loop of thread which has been drawn through the work by the descending needle, and shed therefrom on to the loop-taking point or hook of the shuttle, as in Fig. 17, is extended by the advance of the said point or hook in the rotation of the shuttle, and caused to travel around the shuttle as partly shown in Figs. 18 to 20, the point or hook slips through the said loop until the latter occupies the innermost portion of the shuttle-throat, as shown in Fig. 18. In the position occupied in said figure, the loop is clear of the flanged portion of the point or hook, back of the flange 19. The loop-engaging portion of the shuttle is here reduced in width so that the bend or bight of the loop occupies a position entirely at the shuttle-side of the plane occupied by the bearing. Consequently in the continued rotation of the shuttle that half of the loop which is next the bearing is permitted by the break of continuity in the bearing to swing in between the bearing and the adjacent side of the central portion of the shuttle, as shown clearly in Figs. 19 and 20, and to travel entirely around the shuttle, between the shuttle and bearing. The break in the continuity of the bearing also permits the loop, after completing its travel around the shuttle, to be drawn up by the take-up, clear of the bearing and shuttle, and tightened into the stitch.

The tip of the loop-taking point or hook of the shuttle is at a greater radial distance from the center of rotation than the acting portion of the bearing. To obviate the necessity of a deep throat in the shuttle, which would decrease the relative diameter and capacity of the thread-holding chamber thereof, the rim at the inner edge of the bearing is made narrow radially, as shown in Figs. 5, 12 and 13. Consequently, a comparatively short movement of the loop inward toward the center of rotation is sufficient to carry it safely to the inner side, centrally, of the said rim. To permit the outer side-portion of the extended loop to move without hindrance across the outer face of the central portion of the shuttle, as the loop is passed around the shuttle, the bearing-piece is cupped-out at the side 22ª which is turned toward the said face, as shown in Figs. 5, 12, and 13, and the lateral surfaces of the bearing-piece and of the central portion of the bearing-support 23 are separated from the face in question by a space through which the thread may move without touching the bearing-piece and bearing support.

In operation, a considerable proportion of the pressure that is transmitted to the shuttle from the driving gear 6ᵇ below the same is directed upward, and, also, as the loop of thread passes around the shuttle it tends to lift the latter. When an external bearing or raceway is employed, the lifting tendencies press the top of the shuttle upward against the internal surface of the top part of such bearing or raceway, and act to crowd it into the opening formed across the raceway for the descent and spreading of the loop, with the liability to bind and wear to which reference has been made. It will be obvious why the extent of the said opening must be kept as small as possible, in the case of an external bearing or raceway. In the case of my internal bearing, on the other hand, the exterior of the lower portion of the said bearing offers a backing or support for the lower portion of the shuttle, immediately adjacent the place at which the driving pressure is applied to the periphery of the shuttle for the purpose of rotating the latter, and the lifting tendencies merely operate to press the said lower portion upward against the under side of the bearing, at the opposite side of the center from the opening for the admission and spreading of the loop. All tendency of the shuttle to crowd into the opening during operation, and to bind and wear, is thereby eliminated, and the opening may be made larger than heretofore has been feasible without injurious results. This permits me to extend the opening around to the front far enough to allow the loop to be carried on the loop-taking point or hook in the rotation of the shuttle from the position in Fig. 17, without encountering an obstruction, until the inclined face of the said point or hook assumes a position so closely approximating the inclination of the chord along which the outer side of the loop extends, at the outer face or side of the shuttle (see Fig. 18), that the natural draft (i. e., tension,) of the loop will suffice to cause the loop to slip inward upon the moving point or hook, fully home into the throat as in Fig. 18, and thereby effectuate the spreading. In this instance, the opening in the bearing is of approximately 90° in extent, beginning at a point adjacent the path in which the needle ascends and descends and continuing around in the direction of rotation of the shuttle to the extent just stated.

In a machine in which the shuttle or loop-taker is rotated at a uniform rate of speed, and in which the awl, needle, and take-up are actuated by means of uniformly-rotating cranks, the time-allotment within which the loop must be carried past the greatest diameter (or "bunch") of the shuttle or loop-taker is so brief as to necessitate a short loop-taking point, which involves a short throat. It is necessary to take into account the time between the moment of the entry of the loop-taking tip or point into the loop, and the arrival of the loop at the inner end or bottom of the throat. Furthermore, in the machine described herein, wherein the shuttle or loop-taker makes two revolutions to each complete stroke of the needle, the loop-taking point or hook passes over the descending needle to pick the loop, and again over the ascending needle (at the beginning of the idle revolution of the shuttle or loop-taker) to clear it. Now, shortening the loop-taking point or hook, and the throat necessitate broadening the angle of the working face of the said point or hook, so that in this respect the tendency of the point or hook to carry the loop forward bodily upon it, without slipping therethrough, is increased. Hence, the loop tends to remain at the outer periphery of the loop-taker or shuttle. It therefore will be obvious that in order to enable the spreading to be effected by the natural draft of the loop, it is necessary to permit the loop to be carried around on the point or hook until it assumes the inclination of the chord aforesaid. The internal bearing favors the attainment of this result, because the opening for the loop may be extended to allow as much of a revolution of the shuttle or loop-taker as necessary, up to approximately one-half thereof, to be utilized in spreading the loop, although the full amount is not utilized in the case of the machine herein shown and described. Thereby it is made possible to spread the loop without the aid of special devices for the purpose, or of loop-detents, and without compressing the operation into a short portion of a revolution immediately succeeding the picking, and thereby, also, time enough may be taken to permit a blunt loop-taking point or hook to do its own work.

The spiral gear-drive for the shuttle or loop-taker, herein described, has a tendency to occasion a lateral pressure of the shuttle or loop-taker, against one radial face of the fixed bearing, herein the outer edge of the internal bearing. This insures the rotation of the loop-taking point or hook in a definite plane. Should wear of the contacting surfaces thus pressed together take place to a material extent, adjustment of the bearing laterally by means of the threaded studs and nuts at 231, 232, Figs. 1 and 2, will enable the point or hook to be brought back into the required relation with the needle, thereby compensating for the wear.

When an outside bearing or raceway inclosing the periphery of a shuttle is employed, and a single driving-gear engaging with the shuttle from below, the driving pressure is applied at one end of a diameter of the shuttle, while the actual or effective bearing-support is found at an external point, or points, at or adjacent the opposite end of that diameter. With an internal bearing and an external peripheral drive, as shown and described herein, better leverage conditions are secured, because the driving power is applied farther from the center of rotation than the point at which the resistance due to the frictional contact with the bearing takes effect. With the bearing 22 employed as an internal support for the shuttle, and the latter turning upon the periphery of the said bearing, and there being no external raceway closely fitting the periphery of the shuttle, lint or a loose end of thread carried around by the periphery of the shuttle as the latter rotates cannot become jammed so as to choke or clog the machine. No necessity exists for the employment of either fixed or moving devices to hold or push the loop back.

A loop-detaining point by which the loop of needle-thread which has completed its passage around the loop-taker or shuttle is controlled and prevented from flirting about in being drawn up is shown at 221, provided upon the internal bearing at the end of the latter which is a short distance in the rear of the position of the needle. Constituting an extension or extremity of the bearing itself, and serving to support the loop-taker or shuttle in close proximity to the needle, it occupies the space, previously referred to, between the inwardly projecting lip or flange 26 of the shuttle and the wall of the body of the latter. As the said loop is drawn up by the action of the needle-thread take-up mechanism during the approach of the loop-taking point or hook toward the needle, such loop engages with the detaining point by which it is held and controlled until the take-up action has materially reduced its size, and is then released, to be drawn up into the seam.

In Figs. 5 and 11, the body of the loop-taker or shuttle is shown formed with a central thread-containing chamber or cavity $6^e$, and provided within the said cavity with a tubular post $6^f$ upon which is fitted a bobbin $6^g$ serving in practice as a carrier for the second or interlocking thread. The cover $6^h$ for the said thread-containing chamber or cavity is furnished with a central pin $6^i$ which fits within the said tubular post. The edge of the cover approaches close to the rim of the thread-containing chamber or cavity, there being a small space between the said edge and rim constituting an annular thread-passage through which the thread may issue from the chamber or cavity. The opening of the chamber or cavity is located at the side of the shuttle opposite that at which the bearing and bearing support, needle-bar, needle, and loop-taking point or hook are located, in order that free access to the said cavity may be had for the purpose of taking out an empty bobbin, inserting a filled one, threading-up, etc. The interlocking thread, issuing through the annular thread-passage aforesaid at the side of the loop-taker or shuttle which is farthest from the needle-bar and needle, as in Fig. 5, bends around the rim of the chamber or cavity, and then passes transversely across the loop-taker or shuttle to the last stitch in the work. The said rim is smooth and continuous and constitutes an annular thread-guiding surface around which the interlocking thread renders in passing from the source of supply to the stitch-forming point in the machine. The required tension of the interlocking thread is secured by the compression of the same between the edge of the cover and the said rim. These are inclined or beveled, as indicated in Figs. 5 and 11, to conform somewhat to the direction of the thread in passing out of the thread-containing chamber or cavity, around the rim and across the top of the loop-taker or shuttle to the stitch-making point.

At $6^k$, Figs. 5 and 11, is shown the rim or flange with which the cover $6^h$ for the thread-containing chamber of the loop-taker or shuttle is provided for the purpose of preventing loose coils of the thread wound upon the bobbin $6^g$ from getting between the said cover and the adjacent head of the bobbin and tightening around the bobbin-supporting stud or pin. As previously stated, the said rim or flange overhangs and encircles the edge of the said head, so that coils such as have just been referred to cannot draw in zetween the head and the cover.

The term "loop-taker," as is well-known, is both specific and generic in application. It is used herein in both senses; in the claims it is employed generically.

What is claimed is—

1. In a lock-stitch sewing machine, in combination a loop-taker rotated at a uniform rate of speed, and an awl, a hook-needle, a take-up, and uniformly rotated cranks by which the three parts last mentioned are actuated.

2. In a lock-stitch sewing machine, the combination with a rotary loop-taker, of a stationary internal bearing constituting the main effective support by which it is supported in working position and upon the exterior of which it rotates.

3. In a lock-stitch sewing machine, in combination a rotary loop-taker, a peripheral drive, and a bearing constituting an internal support for the loop-taker and also constituting the main effective support for the latter, which turns upon its exterior.

4. In a lock-stitch sewing machine, in combination a rotary loop-taker, a peripheral drive therefor, and an internal bearing between the loop-taking point of the loop-taker and the center constituting the main effective support, by which it is supported in working position, and upon the exterior whereof it rotates.

5. In a lock-stitch sewing machine, in combination, a hook-needle, and a rotating loop-taker having its entire periphery out of contact with external parts and operative to enter the loop drawn by the needle, take it from the needle, and go entirely through it without assistance from other parts.

6. In a lock-stitch sewing machine, in combination, a hook-needle, a rotating loop-taker provided with a loop-taking point or hook, and an internal bearing constituting the main effective support therefor which permits unobstructed forward movement of the loop with the point or hook until the changing angle of the loop and point or hook, and the tension of the loop, enable the spreading of the loop to take place.

7. In a lock stitch sewing machine, in combination, a rotating loop-taker, and an internal bearing constituting the main effective support for the loop-taker, on the exterior of which the latter turns, and recessed to allow the loop to pass transversely to one lateral face of the said bearing.

8. In a lock-stitch sewing machine, the combination with a rotary loop-taker, of an internal bearing constituting the main effective support therefor, and having a partly annular working portion with opening for permitting the loop to pass transversely to one lateral face of the bearing.

9. In a lock-stitch-sewing machine, in combination a circular loop-taker having a peripheral drive, and a stationary partial annulus constituting an internal bearing for the loop-taker around which the latter rotates, and serving as the sole support therefor.

10. In a lock-stitch sewing machine, in combination a hook-needle, a rotating loop-taker, provided with a flanged loop-taking point or hook which presses the loop from the open eye of the needle by gaining on the latter, and an internal bearing constructed to permit unobstructed forward movement of the loop with the point or hook until the changing angles of the loop and point or hook, and the tension of the loop, enable the point or hook to spread the loop.

11. In a lock-stitch sewing machine, in combination a hook-needle, a rotating loop-taker, provided with a flanged loop-taking point or hook, which presses the loop from the open eye of the needle by gaining on the latter, and with a transverse throat, and an internal bearing constructed to permit unobstructed forward movement of the loop with the point or hook until the changing angles of the loop and point or hook, and the tension of the loop enable the point or hook to push therethrough and place the loop within the throat.

In testimony whereof I affix my signature in presence of two witnesses.

FRANK W. MERRICK.

Witnesses:
CHAS. F. RANDALL,
CLARENCE S. LINKWITER.